United States Patent [19]

Arakawa

[11] Patent Number: 4,736,855
[45] Date of Patent: Apr. 12, 1988

[54] DISPLAY APPARATUS
[75] Inventor: Hideo Arakawa, Tokyo, Japan
[73] Assignee: Arakawa & Co. Ltd., Japan
[21] Appl. No.: 922,161
[22] Filed: Oct. 23, 1986
[30] Foreign Application Priority Data Oct. 23, 1985 [JP] Japan ............................ 60-161315[U]

[51] Int. Cl.⁴ ............................................... A47F 5/08
[52] U.S. Cl. ...................... 211/94; 211/187;
211/207; 108/149
[58] Field of Search ............... 211/94, 94.5, 162, 207,
211/190, 119.15, 119.16, 187; 248/245; 24/136
A; 108/149, 109

[56] References Cited

U.S. PATENT DOCUMENTS

| 950,859 | 3/1910 | Michaud | 211/119.16 X |
| 1,261,622 | 4/1918 | Riordan | 211/119.15 X |
| 3,990,665 | 11/1976 | Joussemet | 108/149 X |
| 4,061,092 | 12/1977 | Jacobsen et al. | 108/149 |
| 4,129,080 | 12/1978 | Vall | 108/149 |
| 4,216,568 | 8/1980 | Anderson | 24/136 A |

FOREIGN PATENT DOCUMENTS

| 235180 | 4/1986 | Fed. Rep. of Germany | 248/1 |
| 17456 | of 1908 | United Kingdom | 24/136 A |

Primary Examiner—Ramon S. Britts
Assistant Examiner—Blair Johnson
Attorney, Agent, or Firm—Steinberg & Raskin

[57] ABSTRACT

Display apparatus having a rail fixable on a stationary structure and provided with a groove, a sliding member fittable in the rail groove and slidable therealong, a wire or cord coupled to the sliding member, a gripping member through which the wire or cord passes, a supporting hook connected to an end of the wire or cord remote from the gripping member, and a second rail having a groove for receiving the hook such that the wire or cord is coupled to the second rail and is tensioned when installed. The gripping member through which the wire or cord passes, comprises a hollow member having an inner tapered surface, a sleeve member having a passage formed therein for the wire or cord and situated within the hollow member to be freely slidable with respect thereto with at least a portion of the sleeve member projecting out from the hollow member, and at least one ball captured in the sleeve member seating against the tapered inner surface of the hollow member and communicating with the passage. A spring urges the sleeve member in a direction in which the inner surface of the hollow member tapers.

15 Claims, 5 Drawing Sheets

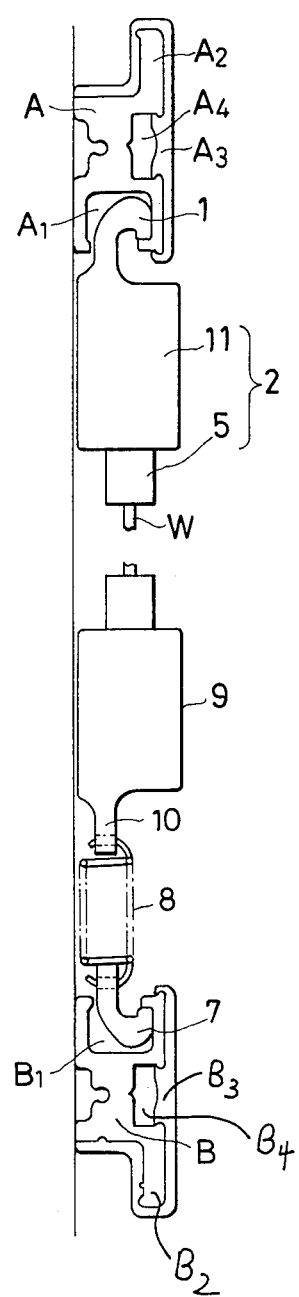
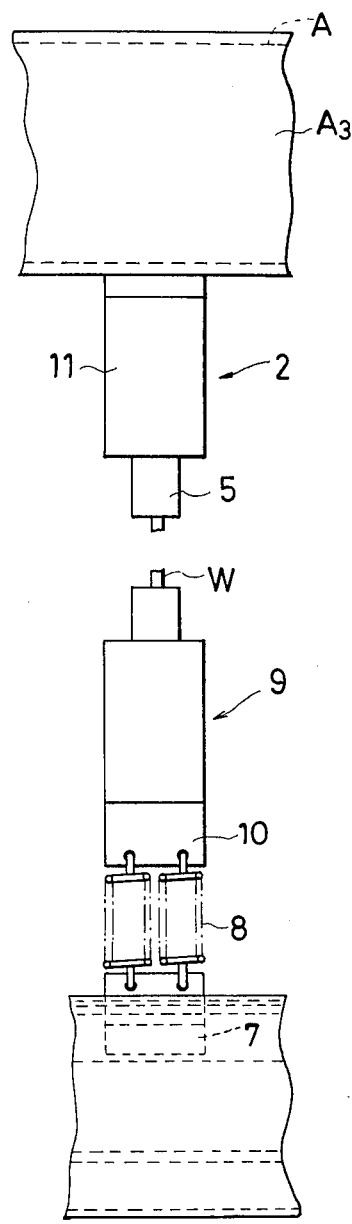
FIG. 1
FIG. 2

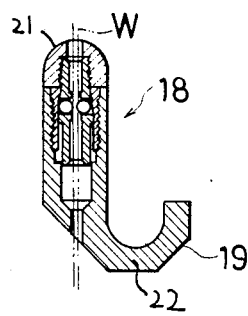
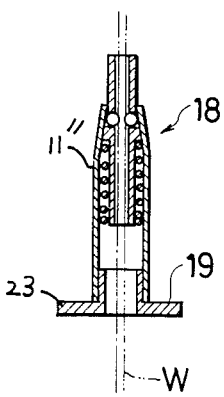
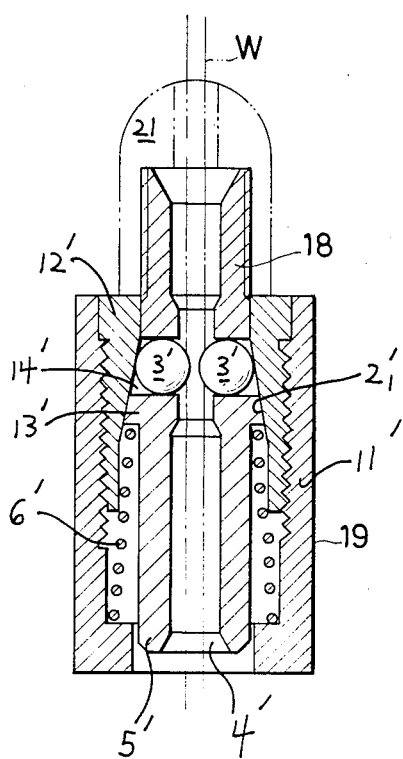
FIG. 7
FIG. 9
FIG. 8

DISPLAY APPARATUS

BACKGROUND OF THE INVENTION

The invention relates to a hanging type of display apparatus for use in shops, exhibition sites, etc. Such display apparatus is intended for flexible space design in exhibiting or display, by mounting interior structures such as shelves, exhibits, and pictures, on to vertically-strained wire rope or cord, both ends of which are retained by rails.

It is conventionally known to mount exhibits onto a wire rope hung in a room or exhibition site, with the two ends of the rope being fixed onto the ceiling or a wall. It is mandatory that such exhibits be fixed to the desired positions of the wire rope to obtain excellent exhibiting or space design results. However, a problem of this conventional manner of hanging exhibits or display items, is that it is extremely hard to remove the exhibits mounted onto the wire rope. Another problem is that replacement of the exhibits is inconvenient if the wire rope is buried into the ceiling and into the floor, and fixed in place. Furthermore, the wire rope itself may not be in harmony with certain decorations, resulting in an unattractive appearance. Moreover, the wire rope frequently allows the exhibits to slip down, thus causing accidents and requiring special care to be taken. Changes in mounting exhibition positions cannot be performed easily or quickly.

SUMMARY OF THE INVENTION

Accordingly, it is an object of the present invention to eliminated the disadvantages noted above.

It is also an object of the present invention to provide for easy installation and removal of display exhibits.

It is another object of the present invention to allow for easy adjustment of position and arrangement of displays and exhibits.

It is a further object of the present invention to avoid the occurrence of accidents in the hanging and display of exhibits.

It is still another object of the present invention to allow exhibits to be suspended from a vertical wall.

These and other objects are obtained by the present invention which is directed to a display apparatus having a first rail fixable on a stationary structure and provided with groove. A sliding member is fittable in the first rail groove and is slidable therealong, with a wire or cord being coupled to the sliding member. Additionally, a gripping member is provided, through which the wire or cord passes. This gripping member in turn comprises a hollow member having an inner tapered surface, and a sleeve member having a passage form therein for the wire or cord. The sleeve member is situated within the hollow member to be freely slidable with respect thereto, and with at least a portion of the sleeve member projecting out from the hollow member. At least one ball is captured in the sleeve member seating against the tapered inner surface of the hollow member, and communicating with the passage. Spring means are provided for urging the sleeve member in the hollow member in the direction in which the inner surface thereof tapers.

The apparatus additionally comprises a supporting hook connected to an end of the wire or cord remote from the gripping member, with means for tensioning the wire or cord also being provided. A second rail is also provided having a groove for receiving the supporting hook such that the wire or cord is coupled to the rail and is tensioned when installed.

Thus according to the present invention, the problems encountered above can be eliminated. The exhibits can slide along the rope or cord easily and quickly, and can also be fixed in position on the rope or cord easily and quickly. This provides for easy positioning and handling of the display exhibits or items, resulting in substantial improvements in efficiency in working, and also providing attractive harmony with respect to the exhibits, in addition to greater safety and wider applications.

BRIEF DESCRIPTION OF THE DRAWINGS

The present invention will be described in greater detail below, with respect to the accompanying drawings, in which FIG. 1 is a side view of a display apparatus in accordance with the present invention;

FIG. 2 is a front view of the display apparatus illustrated in FIG. 1;

FIGS. 7-9 are longitudinal, sectional views of gripping members of a display apparatus in accordance with the present invention.

DESCRIPTION OF THE PREFERRED EMBODIMENTS

Referring to the figures, the display apparatus in accordance with the present invention, which improves over the previous-encountered problems, comprises a rail A fixed to a wall and having a groove $A_1$, with a sliding member 1 being slidable along the rail A and supported by the groove $A_1$ as illustrated. A gripping member 2 for the wire rope or cord W to hang the exhibits, is connected or coupled to the slider 1.

Figure 3:
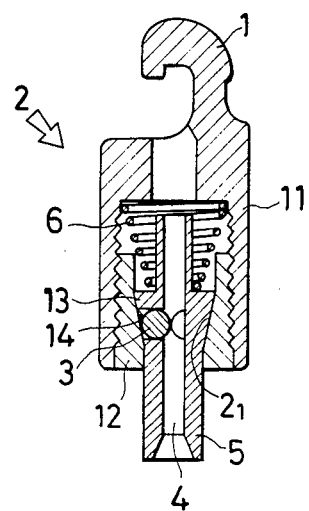
FIG. 3 is a sectional view of a portion of the display apparatus in accordance with the present invention.

More particularly, as illustrated in FIG. 3, the gripping member 2 comprises a hollow cylinder 11 having an inner tapered surface $2_1$ into which a plurality of balls 3, 3 are fit. A spring 6 is provided, one end of which is fixed to the gripper 2, and which provides constant pressure in a predetermined direction. The gripping member 2 also comprises a sleeve 5 which has a hole or passage 4 into which the wire rope or cord W is inserted, and which is disposed for free sliding with respect to the hollow cylinder 11, so that an end of the sleeve 5 may be projected out of the hollow cylinder 11 (the spring 6 urges the sleeve member 5 in the hollow member 11 in a direction in which the inner surface $2_1$ thereof tapers).

Figure 4:
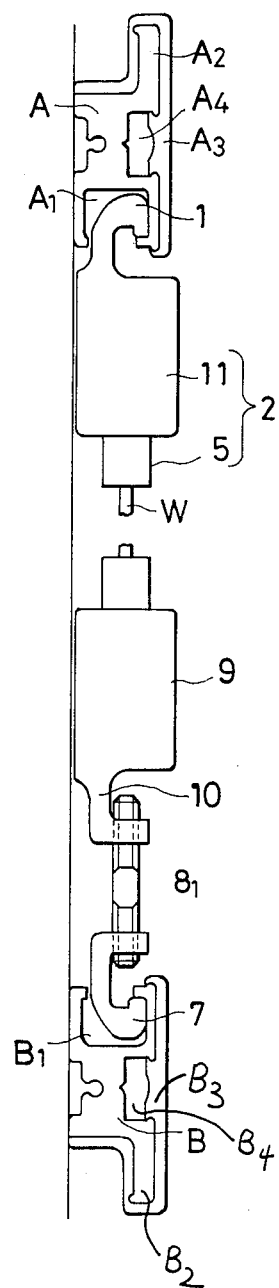
FIG. 4 is a side view of another embodiment of the display apparatus in accordance with the present invention.

The other end of the wire rope or core W is held by a seizing or supporting hook 7 which is retained in a groove $B_1$ of a second rail B and slidable along the second rail B whereby the wire rope or cord W is strained. As best seen in FIGS. 1 and 4, the rail A may be provided with a projecting wall or extension $A_2$ at an upper portion thereof, the projection $A_2$ extending in a direction away from the groove $A_1$ receiving the sliding member 1. The rail A may also be provided with a concave groove $A_4$, upon which a cover $A_3$ may be mounted over the front of the rail A in the longitudinal direction thereof. By the same token, the second rail B may be formed with a similiar configuration as the rail A, namely with a projection $B_2$, groove $B_4$, and cover $B_3$.

The gripper 2, which is provided to retain the upper end of the wire rope or cord W is connected to or coupled with the sliding member 1 which fits into the upper rail A for free sliding therealong. The lower end of the wire rope or cord W is retained by the gripping member 9 which has the same configuration for retaining the wire rope or cord, as the gripping member 2. The gripping member 9 is connected through a variable length tensioning member 8, with the hook 7 which slides along the groove $B_1$ of the lower rail B.

Referring to FIG. 3, the gripping member 2 is a cylindrical or square pole which is hollow and provided with two openings. The gripping member 2 comprises two coaxial and interlinked holes, namely a smaller-diameter hole in the upper portion thereof, and a larger diameter hole which is threaded, in the lower portion thereof, as illustrated. In the gripping member 2, i.e. in the hollow cylinder 11 forming the outer portion thereof, an internal cylinder 12 having the tapered surface $2_1$ is screwed into the larger-diameter threaded hole, towards the upper, smaller-diameter opening. The sleeve member 5 is accomodated within the hollow section formed by the hollow cylinder 11 and the internal cylinder 12 for free sliding with respect thereto in the axial direction. The upper side of the hollow cylinder 11 has the projected sliding member 1.

The sleeve member 5 is also formed as a hollow cylinder, with a portion thereof formed as a cone 13 for fitting against the tapered surface $2_1$ along the center portion of the sleeve member 5, as illustrated. A hole or passage 4 extends through the hollow portion of the sleeve member 5, with the wire rope or cord W passing through this hole 4. Additionally, the cone portion 13 of the sleeve member 5 has a ball-retaining hole 14, which communicates with the guide hole or passage 4 for the wire rope or cord W, and is opened to the exterior of the cone portion 13 (i.e. towards the tapered surface $2_1$). This ball-retaining hole or opening 14 is arrayed substantially radially in the sleeve member 5, and retains the balls 3,3,3.

Both the spring 6 and the sleeve member 5 are mounted within the hollow cylinder 11, in a direction such that the balls 3,3,3 are arrayed in mutual proximity to one another, and with the end of the sleeve member 5 adjacent the small-diameter portion of the cone 13 being projected from the lower end of the hollow cylinder 11. In other words, the spring 6 urges the sleeve member 5 in the hollow member 11, in the direction in which the inner surface $2_1$ thereof tapers. The spring 6 is mounted between the step formed within the hollow cylinder 11 (i.e. the step formed between the lower larger diameter and upper smaller-diameter portions of the internal hole through the hollow cylinder 11) and the step formed by the cone 13 of the sleeve member 5, so that an end of the sleeve member 5 adjacent this step may fit into the smaller-diameter hole of the hollow cylinder 11, and thereby may guide the sliding of the sleeve member 5 within the hollow cylinder 11.

The gripping member 9 has the same structure for gripping the wire rope or cord W as the gripping member 2, and is simply turned up side down when used. A sliding member 1 or alternatively, a connector 10 as illustrated may be coupled or connected with the gripping member 9 and project therefrom. Two tension springs are used as illustrated in FIGS. 1-2 as the variable length member 8, connected to the coupler or connector 10, while a turn buckle $8_1$ is used in FIGS. 4 and 5. The lower end of the variable length member 8 is connected to the hook 7, which is fitted into the groove $B_1$ of the lower rail B, and is used as a sliding member therein, to provide for smooth sliding therealong.

As noted above, the rail A has the groove $A_1$ into which the sliding member 1 is fitted for sliding, along with the projected wall $A_2$ which is used to provide an extension for fixing and the concave groove $A_4$ into which the cover $A_3$ is fitted. Therefore, the rail A may be fitted with a removable plastic cover $A_3$ for providing an attractive appearance upon installation on a wall, the cover $A_3$ covering the entire rail A (FIGS. 1 and 4) with the exception of the groove $A_1$. As noted above, the lower rail B has the same structure as the rail A with the exception of being turned upside down when installed.

Figure 6:
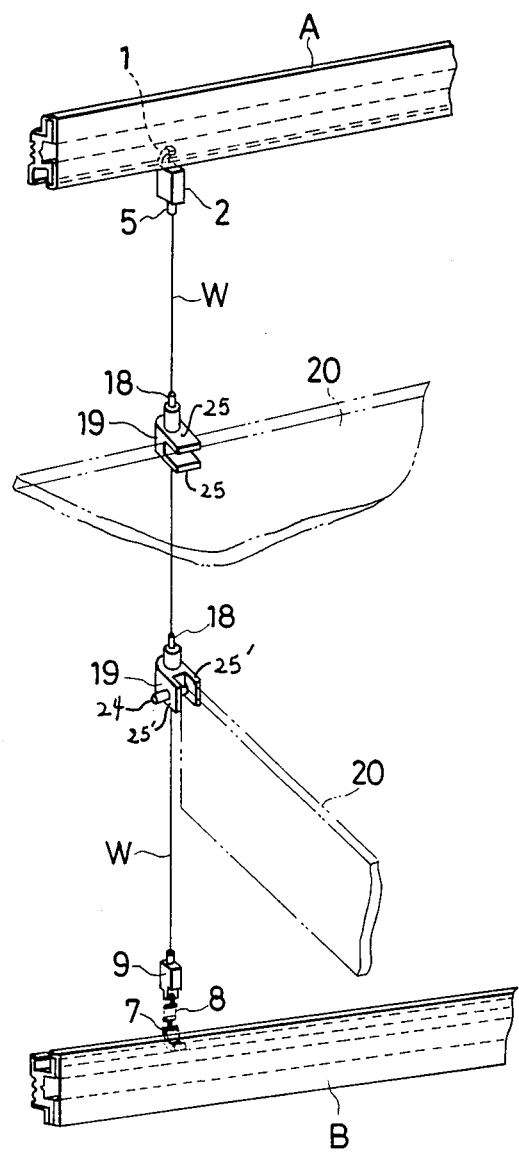
FIG. 6 is an oblique, perspective view of a display apparatus in accordance with the present invention in use.

As illustrated in FIG. 6, intermediate grippers 19 may be positioned along the wire rope or cord W, for retaining various display items, i.e. shelves 20, in position along the rope or cord W. FIGS. 6-9 illustrate various types of intermediate gripping members 19 in accordance with the present invention. All of these intermediate gripping members 19 have a wire rope holding structure 18 which is substantially the same as the structure in the gripping members 2 and 9 for retaining the wire or cord W. In other words, as best seen in FIG. 8, the wire rope holding structure 18 of the intermediate gripping member 19, comprises a hollow cylinder 11' having an inner tapered surface $2_1'$ (provided by the internal cylinder 12' being screwed thereinto), and a plurality of balls 3', 3' seated in a hole 14' and contacting the tapered surface $2_1'$, along with a spring 6', one end of which is fixed and which provides pressure in a constant direction (i.e. in a direction to cause the sleeve member 5' to project out from the hollow cylinder 11'). The sleeve member 5' is provided with a through hole 4' through which the wire rope or cord W is inserted and passed through, the sleeve member 5' also having a conical section 13' seating against the tapered surface $2_1'$.

Additionally, various holders are provided for the display items such as panels or shelves 20. As illustrated in FIG. 6, these retaining holders may be constituted by a pair of substantially parallel extensions 25, 25 or 25', 25' projecting from the intermediate gripping member 19. These respective retaining holders may be situated either substantially vertically (25,25) or substantially horizontally (25', 25') with respect to one another. A retaining member 24 such as a bolt, screw, pin, or the like, may be provided, for retaining the shelves 20 between the projections 25', 25'. Additionally, as illustrated in FIG. 7, the holder for the shelf 20, or the like, may be in the form of a hook 22, while as illustrated in FIG. 9, this retaining holder may be in the form of a circumferential flange 23 extending around the intermediate gripping member 19. Also, in the embodiment illustrated in FIG. 9, the outer cylinder 11" tapers by itself to provide the tapered surface $2_1'$, so there is no need for internal cylinder 12' in this particular embodiment illustrated in FIG. 9. Furthermore, a cap 21 may be situated upon a portion of the sleeve member 5' projecting out from the cylinder 11', as illustrated in FIG.

8. This cap 21' may be screwed onto the projecting end of the sleeve member 5', which may also be threaded as illustrated in FIG. 7.

Thus, in accordance with the present invention, one end of the wire rope or cord W is inserted into the gripping member 2 mounted onto the rail A which is installed substantially horizontally and permitted to be retained there by the balls 3,3,3, while the other end of the wire rope or cord W is inserted into and retained with some tension by the gripping member 9 coupled, through the tensioning member 8 of variable length, with the rail B also installed substantially horizontally.

Figure 5:
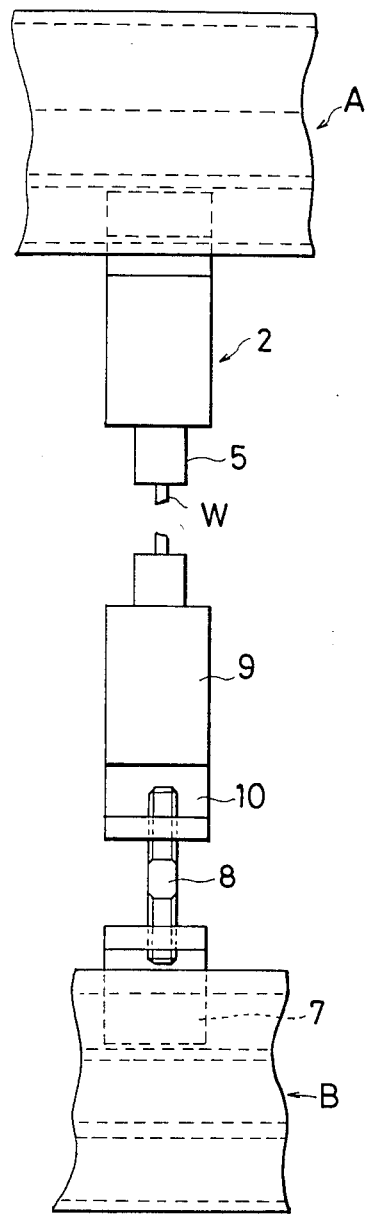
FIG. 5 is a front view of the display apparatus illustrated in FIG. 4.

Referring to FIGS. 1-3, when the wire rope or cord W is retained by the gripping member 9 with slight tension, and then the tension is released, then the wire rope or cord W is strained by the restoring force of the variable length member 8, i.e. the tension springs, while in FIGS. 4 and 5, the turn buckle $8_1$ is used to adjust the tension of the wire rope on cord W. In this manner, several wire ropes or cords W, for example, may be installed with tension, with the shelf 20 being installed between the intermediate gripping members 19 as described above, for functional and attractive uses. The wire ropes or cords W may be easily moved in the horizontal direction, by using the rails A and B.

In the above description, the lower part of the wire rope or cord W has been connected with the variable length member 8 through the gripping member 9. However, the same tension may be obtained by connecting the lower end of the wire rope or cord W directly with the variable length member 8.

Furthermore, the system illustrated in FIGS. 4 and 5 may be installed upside down, while the wire rope or cord W may be strained horizontally or obliquely to retain the exhibits or display items. Additionally, the sliding member 1, connector 10, and hollow cylinder 11, may be formed or combined into a single assembly, for removable convenience.

Therefore, according to the present invention, the display apparatus allows for extremely easy and quick changes in exhibit location and installation, by utilizing wire ropes or cords which are installed in a vertical direction with strain, and are easily moved in the horizontal direction, in addition to providing a great deal of safety and convenience.

The preceding description of the present invention is merely exemplary, and is not intended to limit the scope thereof in any way.

I claim:

1. Display apparatus, comprising
   a first rail fixable on a stationary structure and provided with a groove,
   a sliding member fittable in said first rail groove and slidable therealong,
   a wire or cord coupled to said sliding member,
   a gripping member through which said wire or cord passes, comprising
   a hollow member having an inner tapered surface,
   a sleeve member having a passage formed therein for said wire or cord and being situated within said hollow member and freely slidable with respect thereto, at least a portion of said sleeve member projecting out from said hollow member,
   at least one ball captured in said sleeve member seating against said tapered inner surface of said hollow member and communicating with said passage, and
   spring means for urging said sleeve member in said hollow member in the direction in which said inner surface thereof tapers,
   said apparatus additionally comprising
   a supporting hook conneted to an end of said wire or cord remote from said gripping member,
   means for tensioning said wire or cord,
   a second rail having a groove for receiving said supporting hook such that said wire or cord is coupled to said second rail and tensioned when installed, and
   a second gripping member through which said wire or cord passes, said second gripping member positioned remote from said first gripping member,
   wherein said second gripping member comprises means for connecting the same to said tensioning means, and
   wherein said tensioning means are constituted by at least one spring interconnecting said second gripping member connecting means and said hook.

2. The apparatus of claim 1, wherein said first rail is an upper rail and said second rail is a lower rail.

3. The apparatus of claim 1, wherein said first rail is a lower rail and said second rail is an upper rail.

4. The apparatus of claim 1, wherein said first rail additionally comprises
   a projection extending in a direction away from said groove receiving said sliding member, and
   a second groove situated on said first rail between said projection and said groove receiving said sliding member.

5. The apparatus of claim 4, additionally comprising a cover mounted over said second groove of said first rail.

6. The apparatus of claim 1, wherein said second gripping member also comprises
   a hollow member having an inner tapered surface,
   a sleeve member having a passage formed therein for said wire or cord and being situated within said hollow member and freely slidable with respect thereto, at least a portion of said sleeve member projecting out from said hollow member,
   at least one ball captured in said sleeve member seating against said inner tapered surface of said hollow member and communicating with said passage, and
   spring means for urging said sleeve member in said hollow member in the direction in which said inner surface thereof tapers.

7. The apparatus of claim 1, wherein said tensioning means are constituted by two tension spring.

8. The apparatus of claim 1, additionally comprising at least one intermediate gripping member through which said wire or cord passes, said intermediate gripping member comprising
   means for positioning the same along said wire or cord, and
   means for retaining a display item thereon.

9. The apparatus of claim 8, wherein said positioning means of said intermediate gripping member also comprises
   a hollow member having an inner tapered surface,
   a sleeve member having a passage formed therein for said wire or cord and being situated within said hollow member and freely projecting out from said hollow member,
   at least one ball captured in said sleeve member seating against said tapered inner surface of said hollow member and communicating with said passage, and spring means for urging said sleeve member in said hollow member in the direction in which said inner surface thereof tapers.

10. The apparatus of claim 8, wherein said retaining means are constituted by a circumferential flange extending around said intermediate gripping member.

11. Display apparatus, comprising
a first rail fixable on a stationary structure and provided with a groove,
a sliding member fittable in said first rail groove and slidable therealong,
a wire or cord coupled to said sliding member,
a gripping member through which said wire or cord passes, comprising
a hollow member having an inner tapered surface,
a sleeve member having a passage formed therein for said wire or cord and being situated within said hollow member and freely slidable with respect thereto, at least a portion of said sleeve member projecting out from said hollow member,
at least one ball captured in said sleeve member seating against said tapered inner surface of said hollow member and communicating with said passage, and
spring means for urging said sleeve member in said hollow member in the direction in which said inner surface thereof tapers,
said apparatus additionally comprising
a supporting hook connected to an end of said wire or cord remote from said gripping member,
means for tensioning said wire or cord,
a second rail having a groove for receiving said supporting hook such that said wire or cord is coupled to said second rail and tensioned when installed, and
a second gripping member through which said wire or cord passes, said second gripping member positioned remote from said first gripping member,
wherein said second gripping member comprises means for connecting the same to said tensioning means, and
wherein said tensioning means are constituted by a turn buckle interconnecting said second gripping member connecting means and said hook.

12. Display apparatus, comprising
a first rail fixable on a stationary structure and provided with a groove,
a sliding member fittable in said first rail groove and slidable therealong,
a wire or cord coupled to said sliding member,
a gripping member through which said wire or cord passes, comprising
a hollow member having an inner tapered surface,
a sleeve member having a passage formed therein for said wire or cord and being situated within said hollow member and freely slidable with respect thereto, at least a portion of said sleeve member projecting out from said hollow member,
at least one ball captured in said sleeve member seating against said tapered inner surface of said hollow member and communicating with said passage, and
spring means for urging said sleeve member in said hollow member in the direction in which said inner surface thereof tapers,
said apparatus additionally comprising
a supporting hook connected to an end of said wire or cord remote from said gripping member,
means for tensioning said wire or cord,
a second rail having a groove for receiving said supporting hook such that said wire or cord is coupled to said second rail and tensioned when installed, and
at least one intermediate gripping member through which said wire or cord passes, said intermediate gripping member comprising
means for positioning the same along said wire or cord, and
means for retaining a display item thereon,
wherein said retaining means are constituted by a hook.

13. Display apparatus, comprising
a first rail fixable on a stationary structure and provided with a groove,
a sliding member fittable in said first rail groove and slidable therealong,
a wire or cord coupled to said sliding member,
a gripping member through which said wire or cord passes, comprising
a hollow member having an inner tapered surface,
a sleeve member having a passage formed therein for said wire or cord and being situated within said hollow member and freely slidable with respect thereto, at least a portion of said sleeve member projecting out from said hollow member,
at least one all captured in said sleeve member seating against said tapered inner surface of said hollow member and communicating with said passage, and
spring means for urging said sleeve member in said hollow member in the direction in which said inner surface thereof tapers;
said apparatus additionally comprising
a supporting hook connected to an end of said wire or cord remote from said gripping member,
means for tensioning said wire or cord,
a second rail having a groove for receiving said supporting hook such that said wire or cord is coupled to said second rail and tensioned when installed, and
at least one intermediate gripping member through which said wire or cord passes, said intermediate gripping member comprising
means for positioning the same along said wire or cord, and
means for retaining a display item thereon,
wherein said retaining means are constituted by pair of substantially parallel extensions projecting from said intermediate gripping member.

14. Display apparatus, comprising
a rail fixable on a stationary structure and provided with a groove,
a sliding member fittable in said rail groove and slidable therealong,
a wire or cord coupled to said sliding member, and
a gripping member through which said wire or cord passes, comprising
a hollow member having an inner tapered surface,
a sleeve member having a passage formed therein for said wire or cord and being situated within said hollow member and freely slidable with respect thereto, at least a portion of said sleeve member projecting out from said hollow member,
at least one ball captured in said sleeve member seating against said tapered inner surface of said hollow member and communicating with said passage, and spring means for urging said sleeve member in said hollow member in the direction in which said inner surface thereof tapers, wherein said rail additionally comprises a projection extending in a direction away from said groove receiving said sliding member, and a second groove situated on said rail between said projection and said groove receiving said sliding member, and additionally comprising a cover mounted over said second groove of said rail.

15. Display apparatus, comprising a rail fixable on a stationary structure and provided with a groove, a sliding member fittable in said rail groove and slidable therealong, a wire or cord coupled to said sliding member, and a gripping member through which said wire or cord passes, comprising a hollow member having an inner tapered surface, a sleeve member having a passage formed therein for said wire or cord and being situated within said hollow member and freely slidably with respect thereto, at least a portion of said sleeve member projecting out from said hollow member, at least one ball captured in said sleeve member seating against said tapered inner surface of said hollow member and communicating with said passage, and spring means for urging said sleeve member in said hollow member in the direction in which said inner surface thereof tapers, said apparatus additionally comprising a supporting hook connected to an end of said wire or cord remote from said gripping member, means for tensioning said wire or cord, and a second gripping member through which said wire or cord passes, said second gripping member positioned remote from said first gripping member, wherein said second gripping member comprises means for connecting the same to said tensioning means, and wherein said tensioning means are constituted by at least one spring interconnecting said second gripping member connecting means and said hook.

* * * * *